United States Patent Office 2,707,829
Patented May 10, 1955

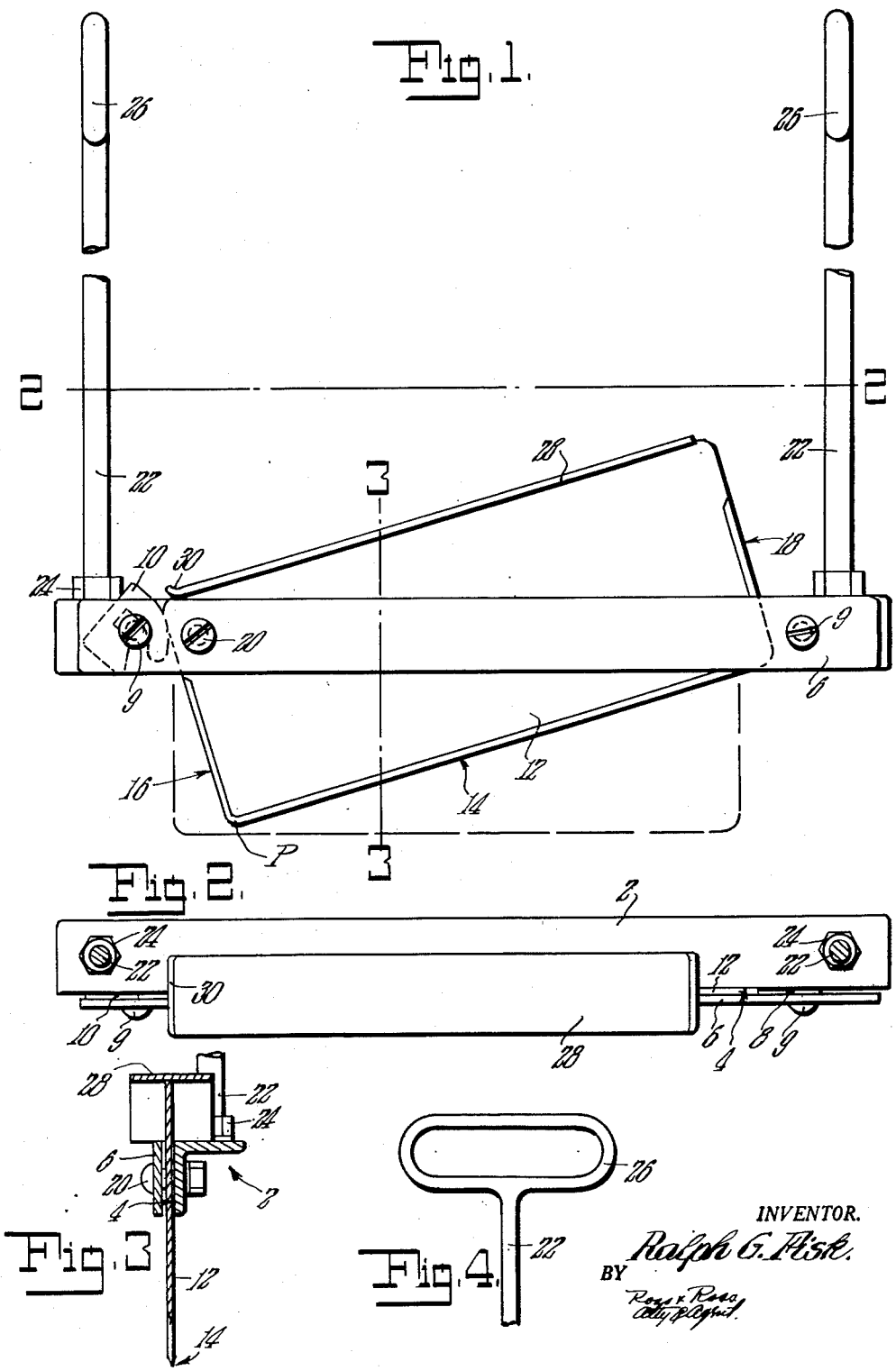

2,707,829
TURF CUTTING TOOL

Ralph G. Fisk, East Longmeadow, Mass.

Application October 4, 1954, Serial No. 459,999

2 Claims. (Cl. 30—315)

This invention relates to improvements in tools for cutting turf.

The principal objects of the invention are directed to the provision of a tool for trimming sod as along a walk or the like or for cutting sections of turf to facilitate the ready and easy removal thereof.

The tool of the invention has many and various uses and while adapted for edging or trimming along the side of a walk or driveway or for cutting squares or other shapes from turf, the use of the tool is not limited thereto.

According to novel features of the invention, the tool is characterized by a frame or support having an elongated blade or knife swingably guided therein between an upper position and a lower cutting position. The blade is provided with treadle means for engagement by the foot for operation thereof and the frame is provided with elongated handle means for engagement by the hands whereby the support or frame may be guided or positioned for action of the blade at and along desired location and line of cut.

All of the above cited objects I accomplish by means of such structure and relative arrangement of parts thereof, as will fully appear by a perusal of the description below and by various specific features which will be hereinafter set forth.

To these above and other ends and with the foregoing and various other and ancillary features and advantages and objects of my invention as will become more readily apparent as the description proceeds, my invention consists in certain features of novelty, in a mode of operation, and in the combination and organization and arrangement of parts as will be hereinafter more particularly pointed out in the claims hereunto annexed and more fully described and referred to in conjunction with the accompanying drawings wherein:

Fig. 1 is a front elevational view of a tool embodying the novel features of the invention;

Fig. 2 is a sectional plan view on the line 2—2 of Fig. 1;

Fig. 3 is a sectional elevational view on the line 3—3 of Fig. 1; and

Fig. 4 is a side elevational view of the upper portion of one of the handle members of the tool shown in Fig. 1.

In the accompanying drawing, I have illustrated a complete example of a physical embodiment of the invention in which the parts are combined and arranged in accordance with one mode I have devised for the practical application of the principles of the invention.

It will however be understood that changes and alterations are contemplated and may be made in these exemplifying drawings and mechanical structures, within the scope of the claims, without departing from the principles of the invention.

That is, I have presented but one embodiment of my invention which is deemed preferable, but is for purposes of illustration only. It is to be understood that the invention is susceptible of incorporation in other modified forms coming equally within the scope of the claims hereof and that changes may be made in various respects and within the scope of the appended claims without departing from the broad aspects and spirit of the invention.

In the following description and claims, various details will be identified by specific names for convenience. These names however are intended to be as generic in their application as the art will permit.

Referring now to the drawing more in detail, in which similar characters of reference indicate corresponding parts in the several figures and referring more particularly to the preferred form of my invention selected for illustrative purposes, I have shown a support which may consist of an elongated member in the form of an angle 2, or the like having a forward vertically disposed face 4.

An elongated strap 6 is secured at its opposite end portions to end portions of the member 2 with washers 8 and 10 therebetween to provide an elongated vertically disposed slot between said support and strap.

The securing means may be bolts, rivets or the like 9 so that the support and strap provide strong, rigid, frame structure.

An elongated blade 12 having a sharpened lower edge 14 and preferably sharpened ends 16 and 18 is disposed in the slot for free vertical swinging movements therein.

Said blade is pivotally connected adjacent one end thereof to the frame as by a rivet, bolt or the like indicated by 20 for swinging of the blade in a vertical plane between the upper position shown and a lower cutting position represented by dash lines.

Handle members 22 have lower ends extending through the support 2 and are secured thereto in one way as by nuts 24 in threaded engagement therewith. The members 22 extend upwardly vertically from the frame and at upper ends they are provided with hand grips of any desired form but which for illustrative purposes are shown as loops 26.

Treadle means 28 is provided on the upper edge of the blade and preferably consists of an elongated strip secured to the blade as by welding or the like. Said treadle means may if desired consist of a portion of said blade displaced transversely relative to the plane thereof.

Stop means is provided which may consist of an end 30 of the treadle which is formed to abut the frame in the upper position of the blade. Or the washer 10 may be arranged to be engaged by the adjacent end of the blade in its upper position.

The blade 12 is shown in upper position and in such position the lower and adjacent end edge forms a point P below the frame.

With the handles grasped in the hands and held vertically the point P of the blade is positioned on the ground at the place where it is desired to commence a cut and the frame and blade are aligned with the direction of the cut to be made, as for instance along the edge of a sidewalk or the alike.

A foot is placed on the treadle 28 and by pressing downwardly the blade is swung downwardly in cutting direction. In the downward cutting movement the action is such that the blade in the ground tends to move the tool longitudinally relative to the line of cut, a movement which is advantageous to the cutting action.

After each cut, the tool is moved along the line of cut and successive cuts are made. The cutting is not only readily and easily accomplished but cutting along a walk, commonly called "edging" is accomplished more efficiently and at a relatively faster rate than by prior art devices.

The tool has many and various uses such as edging, cutting areas for turf removal and the like and has been found to be efficient in operation.

While I have illustrated and described the invention as embodied in a specific arrangement, I do not intend to be limited to the details shown since various modifications and structural changes may be made without departing in any way from the spirit of the invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the claims below.

What it is desired to claim and secure by Letters Patent of the United States is:

1. A tool of the class described comprising in combination, an elongated frame member having a forward face and handle members fixed thereto and extending upwardly from opposite ends thereof, an elongated guide member and means securing opposite ends of the guide member and forward face of the frame in spaced relation providing an elongated vertically disposed slot between said face and guide member, an elongated blade disposed in said slot and means pivotally connecting an end portion thereof to an end portion of said frame for swinging of said blade in said slot between upper and lower cutting positions, treadle means on the upper longitudinal edge of said blade, and means limiting upward movements of said blade relative to said frame.

2. A tool set forth in claim 1 wherein said treadle means includes a member secured to the upper side of said blade disposed in a plane transverse to the plane of said blade.

References Cited in the file of this patent

UNITED STATES PATENTS

| | | |
|---|---|---|
| 2,503,757 | Morgan | Apr. 11, 1950 |
| 2,540,597 | Riggs | Feb. 6, 1951 |
| 2,594,508 | Sitton | Apr. 29, 1952 |

FOREIGN PATENTS

| | | |
|---|---|---|
| 123,566 | Australia | Feb. 11, 1947 |